(12) United States Patent
Carey et al.

(10) Patent No.: US 6,800,154 B1
(45) Date of Patent: Oct. 5, 2004

(54) EMULSION COMPOSITIONS

(75) Inventors: Jeffrey M. Carey, Mentor, OH (US); Jill M. Marlow, Macedonia, OH (US)

(73) Assignee: The Lubrizol Corporation, Wickliffe, OH (US)

( * ) Notice: Subject to any disclaimer, the term of this patent is extended or adjusted under 35 U.S.C. 154(b) by 2 days.

(21) Appl. No.: 10/049,766

(22) PCT Filed: Jul. 21, 2000

(86) PCT No.: PCT/US00/19953

§ 371 (c)(1),
(2), (4) Date: Jan. 23, 2002

(87) PCT Pub. No.: WO01/07381

PCT Pub. Date: Feb. 1, 2001

Related U.S. Application Data

(60) Provisional application No. 60/145,633, filed on Jul. 26, 1999.

(51) Int. Cl.$^7$ .......................... C06B 45/00; C06B 31/28; D03D 23/00; C10M 113/00
(52) U.S. Cl. .......................... 149/2; 149/46; 149/109.6; 508/511
(58) Field of Search .......................... 149/2, 46, 109.6, 149/21, 74; 548/404; 508/506, 511, 530, 532

(56) References Cited

U.S. PATENT DOCUMENTS

| | | | |
|---|---|---|---|
| 3,163,603 A | 12/1964 | LeSuer | 252/33.6 |
| 3,306,908 A | 2/1967 | LeSuer | 260/326.3 |
| 3,791,805 A | 2/1974 | Brannen et al. | 44/68 |
| 4,305,766 A | 12/1981 | Edmonds et al. | 149/2 |
| 4,500,369 A | 2/1985 | Tag et al. | 149/2 |
| 4,600,450 A | 7/1986 | Jessop et al. | 149/19.3 |
| 4,632,714 A | 12/1986 | Abegg et al. | 149/2 |
| 4,711,678 A | 12/1987 | Ehrnström | 149/2 |
| 4,770,803 A | 9/1988 | Forsberg | 252/75 |
| 4,863,534 A | 9/1989 | Forsberg | 149/2 |
| 4,875,951 A | 10/1989 | Prest et al. | 149/109.6 |
| 5,026,442 A | 6/1991 | Yabsley et al. | 149/2 |
| 5,129,972 A | 7/1992 | Riga et al. | 149/2 |
| 5,407,500 A * | 4/1995 | Forsberg et al. | 149/2 |
| 5,527,491 A | 6/1996 | Riga et al. | 252/356 |
| 5,620,946 A | 4/1997 | Jahnke et al. | 507/131 |

FOREIGN PATENT DOCUMENTS

| | | |
|---|---|---|
| EP | 0347127 A1 | 12/1989 |
| EP | 0408838 A1 | 1/1991 |
| EP | 0493638 A1 | 7/1992 |
| EP | 0621249 A1 | 10/1994 |
| EP | 0711740 A1 | 5/1996 |
| WO | WO96/28436 | 9/1996 |

OTHER PUBLICATIONS

International Search Report from corresponding PCT International Application No. PCT/US00/19953.

* cited by examiner

*Primary Examiner*—Aileen B. Felton
(74) *Attorney, Agent, or Firm*—Samuel B. Laferty; Michael F. Esposito

(57) ABSTRACT

An emulsion comprising: (A) a discontinuous phase; (B) a continuous organic phase; and (C) an emulsifying amount of at least one nitrogen and transition metal containing composition derived from hydrocarbon substituted polycarboxylic acids or functional equivalent thereof, selected from the group consisting of (C-1) amide and imide derivatives of transition metal salts, (C-2) transition metal complexes of non-acidic acylated nitrogen compounds, and (C-3) a mixture of acylated nitrogen compounds and transition metal salts. In one particular embodiment, the invention relates to explosive emulsions wherein (A) is a discontinuous oxidizer phase comprising at least one oxygen-supplying component and (B) is a continuous organic phase which comprises at least one carbonaceous fuel. In another embodiment, the discontinuous phase (A) is a discontinuous aqueous phase.

24 Claims, No Drawings

EMULSION COMPOSITIONS

This application claims the benefit of provisional application Ser. No. 60/145,623 Jul. 26, 1999.

FIELD OF THE INVENTION

This invention relates to water-in-oil emulsion compositions and particularly to explosive emulsions.

BACKGROUND OF THE INVENTION

Amine derivatives of succinic anhydride have been used as emulsifiers. U.S. Pat. Nos. 5,512,079 and 5,518,517 disclose amine derivatives of succinic acylating agents for use as emulsifiers in delayed release emulsion fertilizers.

Water-in-oil emulsions have been used for a variety of uses including emulsion explosives. Water-in-oil explosive emulsions typically comprise a continuous organic phase and a discontinuous oxidizer phase containing water and an oxygen-supplying source such as ammonium nitrate, the oxidizer phase being dispersed throughout the continuous organic phase. Examples of such water-in-oil explosive emulsions are disclosed, inter alia, in U.S. Pat. Nos. 5,047,175; and 4,828,633. The emulsifier is a salt derived from high molecular weight carboxylic acylating agent coupled to a low molecular weight carboxylic acylating agent. Succinic acids and anhydrides are the preferred acylating agents. Other examples of such water-in-oil explosive emulsions are disclosed in U.S. Pat. Nos. 3,447,978; 3,765,964; 3,985,593; 4,008,110; 4,097,316; 4,104,092; 4,218,272; 4,259,977; 4,357,184; 4,371,408; 4,391,659; 4,404,050; 4,409,044; 4,448,619; 4,453,989; and 4,534,809; and U.K. Patent Application GB 2,050,340A.

U.S. Pat. No. 4,710,248 discloses an emulsion explosive composition comprising a discontinuous oxidizer-phase dispersed throughout a continuous fuel phase with a modifier comprising a hydrophilic moiety and a lipophilic moiety. The hydrophilic moiety comprises a carboxylic acid or a group capable of hydrolyzing to a carboxylic acid. The lipophilic moiety is a saturated or unsaturated hydrocarbon chain. The emulsion explosive composition pH is above 4.5.

U.S. Pat. Nos. 4,840,687 and 4,956,028 disclose explosive compositions comprising a discontinuous oxidizer phase comprising at least one oxygen-supplying component, a continuous organic phase comprising at least one water-immiscible organic liquid, and an emulsifying amount of at least one nitrogen-containing emulsifier derived from (A) at least one carboxylic acylating agent, (B) at least one polyamine, and (C) at least one acid or acid-producing compound capable of forming at least one salt with said polyamine. Examples of (A) include polyisobutenyl succinic acid or anhydride. Examples of (B) include the alkylene polyamines. Examples of (C) include the phosphorus acids (e.g., O,S-dialkylphosphorotrithioic acid). These explosive compositions can be water-in-oil emulsions or melt-in-oil emulsions.

U.S. Pat. No. 4,863,534 discloses an explosive composition comprising a discontinuous oxidizer phase comprising at least one oxygen-supplying component, a continuous organic phase comprising at least one carbonaceous fuel, and an emulsifying amount of (A) at least one salt composition derived from (A)(1) at least one high-molecular weight hydrocarbyl-substituted carboxylic acid or anhydride, or ester or amide derivative of said acid or anhydride, the hydrocarbyl substituent of (A)(1) having an average of from about 20 to about 500 carbon atoms, and (A)(2) ammonia, at least one amine, at least one alkali or alkaline earth metal compound; and (B) at least one salt composition derived from B)(1) at least one low-molecular weight hydrocarbyl-substituted carboxylic acid or anhydride, or ester or amide derivative of said acid or anhydride, the hydrocarbyl substituent of (B)(1) having an average of from about 8 to about 18 carbon atoms, and (B)(2) ammonia, at least one amine, at least one alkali or alkaline earth metal, and/or at least one alkali or alkaline earth metal compound.

U.S. Pat. No. 4,822,433 discloses an explosive emulsion composition comprising a discontinuous phase containing an oxygen-supplying component and an organic medium forming a continuous phase wherein the oxygen-supplying component and organic medium are capable of forming an emulsion which, in the absence of a supplementary adjuvant, exhibits an electrical conductivity measured at 60° C., not exceeding 60,000 picomhos/meter. The reference indicates that the conductivity may be achieved by the inclusion of a modifier which also functions as an emulsifier. The modifier is comprised of a hydrophilic moiety and a lipophilic moiety. The lipophilic moiety can be derived from a poly[alk(en) yl]succinic anhydride. Poly(isobutylene)succinic anhydride having a number average molecular weight in the range of 400 to 5000 is specifically identified as being useful. The hydrophilic moiety is described as being polar in character, having a molecular weight not exceeding 450 and can be derived from polyols, amines, amides, alkanol amines and heterocyclics. Example 14 of this reference discloses the use of a 1:1 condensate of polyisobutenyl succinic anhydride (number average molecular weight=1200) and dimethylethanol amine as the modifier/emulsifier.

U.S. Pat. No. 4,919,178 discloses water in oil emulsion explosives in which the emulsifier is the reaction product of two components. The first component is the reaction product certain carboxylic acids or anhydrides, including substituted succinic acids and anhydrides with ammonia or an amine and an alkali metal or an alkaline earth metal. The second component is the salt of a phosphorous containing acid.

European Patent application EP 561,600 A discloses a water-in-oil emulsion explosive in which the emulsifier is the reaction product of a substituted succinic acylating agent, having at least 1.3 succinic groups per equivalent weight of substituents, with ammonia and/or an amine. The substituent is a polyalkene having number average molecular weight of greater than 500 and preferably 1300–1500.

U.S. Pat. No. 4,919,179 discloses a water-in oil emulsion explosive wherein the emulsifier is a particular type of ester of polyisobutenyl succinic anhydride.

U.S. Pat. No. 4,844,756 discloses a water-in-oil emulsion explosive wherein the emulsifier is a salt produced by reacting a hydrocarbyl substituted carboxylic acid or anhydride, including substituted succinic acids and anhydrides, with ammonia, an amine, and/or an alkali or alkaline earth metal.

U.S. Pat. No. 4,818,309 discloses a water-in-oil emulsion explosive wherein the emulsifier is a polyalkenyl succinic acid or derivative thereof. The succinic acid may be used in the form of an anhydride, an ester, an amide or an imide. A condensate with ethanolamine is preferred.

U.S. Pat. No. 4,708,753 discloses a water-in-oil emulsion suitable for use in explosive and functional fluids wherein the emulsifier is a reaction product of a hydrocarbyl substituted carboxylic acid, including a succinic acid, with an amine. The substituent contains 20–500 carbon atoms, and the aqueous phase contains a water soluble, oil insoluble functional additive.

European Patent EP 102,827 A discloses a water-in-oil emulsion composition useful as a well control fluid. The emulsifier is a polyamine derivative, especially an alkylene polyamine derivative, of a polyisobutenyl succinic anhydride or a borated or carboxylated derivative thereof.

U.S. Pat. No. 4,445,576 discloses a water-in-oil emulsion composition useful as a spacer fluid in well drilling. The emulsifier is an amine derivative, especially a polyamine derivative, of a polyalkenyl succinic anhydride.

U.S. Pat. No. 4,999,062 describes an emulsion explosive composition comprising a discontinuous phase comprising an oxygen-releasing salt, a continuous water-immiscible organic phase and an emulsifier component comprising a condensation product of a primary amine and a poly[alk(en)yl]succinic acid or anhydride and wherein the condensation product comprises at least 70% by weight succinimide product.

United States defensive publication T969,003 discloses water in oil emulsion fertilizer compositions prepared by dissolving an invert emulsifier in an oil such as kerosene. A liquid (aqueous) fertilizer is emulsified with the oil to form an invert emulsifier.

Patent application WO 96/28436 describes gamma and delta lactones of formulae (I) and (II)

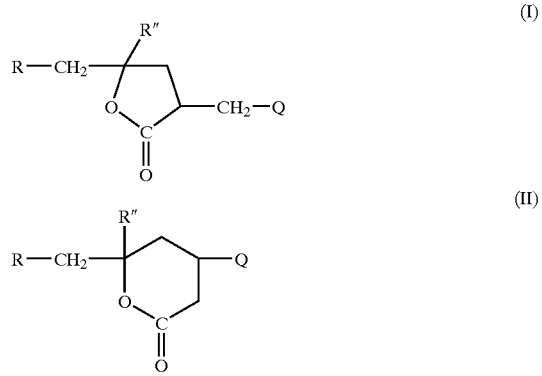

used as emulsifiers in explosive compositions comprising a continuous organic phase and a discontinuous aqueous phase containing an oxygen-supplying compound. In the formulae, R is hydrocarbyl, R* is hydrogen, methyl or another hydrocarbyl, and Q is an amide, ammonium salt or ester functionality.

Water-in-oil explosive emulsions are often blended with ammonium nitrate prills or ANFO, a composition produced by adding a liquid oil such as light oil and the like to porous ammonium nitrate prills for the purpose of increasing the explosive energy of such emulsions.

SUMMARY OF THE INVENTION

The present invention relates to an emulsion comprising
(A) a discontinuous phase;
(B) a continuous organic phase; and
(C) an emulsifying amount of at least one nitrogen and transition metal containing composition derived from hydrocarbon substituted polycarboxylic acids or functional equivalent thereof, selected from the group consisting of
   (C-1) amide and imide derivatives of transition metal salts,
   (C-2) transition metal complexes of non-acidic acylated nitrogen compounds, and
   (C-3) a mixture of acylated nitrogen compounds and transition metal salts.

In one particular embodiment, the invention relates to explosive emulsions wherein (A) is a discontinuous oxidizer phase comprising at least one oxygen-supplying component and (B) is a continuous organic phase which comprises at least one carbonaceous fuel.

In another embodiment, the discontinuous phase (A) is a discontinuous aqueous phase.

DETAIL DESCRIPTION OF THE PREFERRED EMBODIMENTS

The term "emulsion: as used in this specification and in the appended claims is intended to cover not only water-in-oil emulsions but also melt-in-oil emulsions. The water-in-oil emulsions have a discontinuous aqueous phase, and explosive emulsions contain oxidizing materials suspended in a continuous oil phase. The melt-in-oil emulsions have a discontinuous oxidizer phase containing oxidizing salts which have a melting point low enough that they may be conveniently emulsified into the continuous oil phase. The oxidizing salts may, and often do, contain some water of hydration and accordingly, an emulsion prepared without addition of water to form the discontinuous phase may actually contain some water. However, the presence of water in a melt-in-oil emulsion is not required and the discontinuous phase often comprises a low melting mixture of oxidizing salts. Although there is not a sharp line between water in oil and melt-in-oil emulsions, the term water in oil is used when the salts are dissolved in additional water to form the discontinuous phase and the term melt-in-oil is used when the oxidizing salts are liquefied without the addition of water to form the discontinuous phase.

As used herein, the term "hydrocarbon" means a group which is purely hydrocarbon, that is, a compound of hydrogen and carbon containing no hetero atoms. The terms "hydrocarbyl" and "hydrocarbon based" mean that the group being described has predominantly hydrocarbon character within the context of this invention. Hydrocarbyl and hydrocarbon based groups include groups that are purely hydrocarbon in nature, that is, they contain only carbon and hydrogen. They may also include groups containing non-hydrocarbon substituents or atoms which do not alter the predominantly hydrocarbon character of the group. Such substituents may include halo-, alkoxy-, nitro-, etc. These groups also may contain hetero atoms. Suitable hetero atoms will be apparent to those skilled in the art and include, for example, sulfur, nitrogen and oxygen. Therefore, while remaining predominantly hydrocarbon in character within the context of this invention, these groups may contain atoms other than carbon present in a chain or ring otherwise composed of carbon atoms. Thus, the terms "hydrocarbyl" and "hydrocarbon based" are broader than the term "hydrocarbon" since all hydrocarbon groups are also "hydrocarbyl" or "hydrocarbon based" groups while hydrocarbyl groups or hydrocarbon based groups containing hetero atoms are not hydrocarbon groups as defined herein.

In general, no more than about three non-hydrocarbon substituents or hetero atoms, and preferably no more than one, will be present for every 10 carbon atoms in hydrocarbyl or hydrocarbon based groups. Most preferably, these groups are purely hydrocarbon in nature, that is they are essentially free of atoms other than carbon and hydrogen.

The Emulsions

The emulsifiers used in the present invention are particularly useful for preparing oil continuous phase emulsions, that is, water-in-oil emulsions in which there are high levels of active components in the dispersed aqueous phase.

The water-in-oil emulsions have the bulk characteristics of the continuous oil phase even though on a volume basis, the aqueous phase may be the predominant phase. This characteristic is particularly useful in forming functional fluids such as metalworking fluids in which it is convenient to have the lubricity of an oil phase, while having the non-flammability of a material which is predominantly aqueous. This is especially true in the area of metal-cutting fluids where the predominant oil phase can provide lubrication, while the aqueous phase has a high heat capacity, and carries away the heat of the cutting operation better than the oil phase is able to do.

The emulsions may be prepared by mixing the emulsifier with the oil phase and then adding the oil phase to the aqueous phase, with stirring.

Water-in-oil emulsions generally contain at least 2% by weight of the continuous oil phase. More preferably, they contain between about 2% to about 10% by weight of the continuous oil phase, and most preferably, in the range from about 3.5 to about 8% by weight of the oil phase. The discontinuous aqueous phase comprises from about 5% to about 99% by weight, preferably at least about 90% by weight, more preferably from about 90% to about 98% by weight and most preferably from about 92 to about 96.5% by weight based on the total weight of the emulsion. The emulsifiers are generally present at a level from about 4% often from about 5%, up to about 50%, often up to about 40% by weight, more preferably from about 12 to 20% by weight based upon the total weight of the organic phase.

(A) The Discontinuous Phase

The discontinuous phase of the emulsion may comprise a substantially anhydrous component such as molten salts such as oxidizers. These include melts of non-aqueous oxidizing salts and may comprise eutectic mixtures.

More often the discontinuous phase is an aqueous phase comprising, for example, oxygen supplying components in explosives, fertilizer components, and the like.

(B) The Continuous Organic Phase

The emulsion compositions of this invention comprise a continuous organic phase which often comprises an oil or a wax.

In the water-in-oil emulsions of the present invention, the oil serves to protect fertilizer components, which are in the aqueous phase, and control their release to the environment. In emulsion explosives, the oil prevents the coalescence of the discontinuous aqueous phase, but more importantly is the oxidizable phase or the fuel for the explosion. In metal working fluids, the oil provides lubricating properties. Many of the same types of oils may be used for these types of compositions.

The oil that is useful in the emulsions of the present invention can include oils from a variety of sources, including natural and synthetic oils and mixtures thereof. Hydrocarbon oils, for example, paraffinic, olefinic, naphthenic, aromatic, saturated or unsaturated hydrocarbons, may be used. In general, the oil is water-immiscible, emulsifiable and is either liquid at about 20° C. or becomes a liquid at a temperature of up to about 95° C., and preferably up to about 60° C. Oils from a variety of sources, including natural and synthetic oils, may be used.

Natural oils include animal oils and vegetable oils (e.g., castor oil, lard oil) as well as solvent-refined or acid-refined mineral oils of the paraffinic, naphthenic, or mixed paraffin-naphthenic types. Oils derived from coal or shale are also useful. Synthetic oils include hydrocarbon oils such as polymerized and interpolymerized olefins (e.g., polybutylenes, polypropylenes, propylene-isobutylene copolymers, chlorinated polybutylenes, etc.); alkyl benzenes (e.g., dodecylbenzenes, tetradecylbenzenes, dinonylbenzenes, di-(2-ethylhexyl)benzenes, etc.); polyphenyls (e.g., biphenyls, terphenyls, alkylated polyphenyls, etc.); and the like.

Another suitable class of synthetic oils that can be used comprises the esters of dicarboxylic acids (e.g., phthalic acid, succinic acid, alkyl succinic acid, maleic acid, azelaic acid, suberic acid, sebacic acid, fumaric acid, adipic acid, linoleic acid dimer, malonic acid, alkyl malonic acids, alkenyl malonic acids, etc.) with a variety of alcohols (e.g., butyl alcohol, hexyl alcohol, dodecyl alcohol, 2-ethylhexyl alcohol, ethylene glycol, diethylene glycol monoether, propylene glycol, pentaerythritol, etc.). Specific examples of these esters include dibutyl adipate, di(2-ethylhexyl)-sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethyl-hexanoic acid, and the like.

Esters useful as synthetic oils also include those made by reacting $C_5$ to $C_{24}$ monocarboxylic acids mono alcohols or polyols. The mono alcohols include $C_1$ to $C_{18}$ aliphatic alcohols. Polyols include neopentyl glycol, trimethylol propane, pentaerythritol, dipentaerythritol, tripentaerythritol, and polyol ethers.

Silicon-based oils and silicate oils comprise another class of useful oils. Also useful are the liquid esters of phosphorous-containing acid, polymeric tetrahydrofurans, and the like.

Unrefined, refined and rerefined oils and mixtures of thereof can be used. Unrefined oils are those obtained directly from a natural or synthetic source without further purification treatment For example, a shale oil obtained directly from a retorting operation, a petroleum oil obtained directly from distillation or ester oil obtained directly from an esterification process and used without further treatment would be an unrefined oil. Refined oils are similar to the unrefined oils except that they have been further treated in one or more purification steps to improve one or more properties. Many such purification techniques are known to those of skill in the art such as solvent extraction, distillation, acid or base extraction, filtration, percolation, etc. Rerefined oils may be used as the oil phase. Such rerefined oils are also known as reclaimed or reprocessed oils and often are obtained by processes similar to those used to obtain ordinary refined oils. These rerefined oils may be additionally processed by techniques directed toward removal of spent additives and oil breakdown products.

Examples of useful oils include a white mineral oil available from Witco Chemical Company under the trade designation KAYDOL; a white mineral oil available from Shell under the trade designation ONDINA; and a mineral oil available from Pennzoil under the trade designation N-750-HT. Diesel fuel oil as specified in ASTM D-975, Standard Specification for Diesel Fuel Oils, can be used.

Also useful are waxes having melting points of at least about 25° C., such as petrolatum wax, microcrystalline wax, and paraffin wax; mineral waxes such as ozoceite and montan wax; animal waxes such as spermacetic wax, and insect waxes such as beeswax and Chinese wax. Useful waxes include those identified by the designation MOBIL-WAX 57, available from Mobil Oil Corporation, D02764, a blended wax available from Astor Chemical Ltd., and VYBAR, available from Petrolite Corporation. Preferred waxes are blends of microcrystalline waxes and paraffin.

In one embodiment, the oil comprises a combination of a wax and an oil. The wax content can be at least about 25% and preferably is at least about 25% up to about 90% by weight of the organic phase, and the oil content can be at least about 10% and preferably ranges from about 10% to about 75% by weight of the organic phase.

The Oxygen-Supplying Component

In one embodiment, particulate-solid oxygen-supplying salts may be incorporated into or blended with the inventive emulsions to increase the explosive energy of such emulsions. These salts can be ammonium nitrate, sodium nitrate, calcium nitrate or mixtures of two or more thereof. Ammonium nitrate is particularly useful. The oxygen-supplying component is preferably at least one inorganic oxidizer salt such as ammonium, alkali or alkaline earth metal nitrate, chlorate or perchlorate. Examples include ammonium nitrate, sodium nitrate, calcium nitrate, ammonium chlorate, sodium perchlorate and ammonium perchlorate. Ammonium nitrate is preferred. Mixtures of ammonium nitrate and sodium or calcium nitrate are also useful. In one embodiment, inorganic oxidizer salt comprises principally ammonium nitrate, although up to about 25% by weight of the oxidizer phase can comprise either another inorganic nitrate (e.g., alkali or alkaline earth metal nitrate) or an inorganic perchlorate (e.g., ammonium perchlorate or an alkali or alkaline earth metal perchlorate) or a mixture thereof.

Ammonium nitrate particulate solids, (e.g., ammonium nitrate prills), which are available in the form of preblended ammonium nitrate-fuel oil (ANFO) mixtures, can be used. Typically, ANFO contains about 94% by weight ammonium nitrate and about 6% fuel oil (e.g., diesel fuel oil), although these proportions can be varied.

The quantities of these particulate-solid oxygen-supplying salts or ANFO that are used can comprise up to about 80% by weight of the total explosive composition. In one embodiment of the invention, explosive compositions comprising about 25% to about 35% by weight of the inventive emulsion and about 65% to about 75% of particulate solid, oxygen-supplying salts or ANFO are used. In one embodiment, explosive compositions comprising about 45% to about 55% by weight of the inventive emulsion and about 45% to about 55% of particulate solid, oxygen-supplying salts or ANFO are used. In one embodiment, explosive compositions comprising about 70% to about 80% by weight of the inventive emulsion and about 20% to about 30% of particulate solid, oxygen-supplying salts or ANFO are used. Ammonium nitrate prills are especially useful. These particulate solids can be in the form of prills, crystals or flakes.

In one embodiment, the oxygen-supplying component comprises from about 75% up to about 100% of the oxidizer phase.

The oxidizer phase may be a molten phase.

In this embodiment, the composition is a melt-in-fuel emulsion. In such emulsions, the discontinuous oxidizer phase comprises a mixture of oxidizing salts which are melted and are used to form an emulsion much like that formed using aqueous solutions of the oxidizing salts. The oxidizer melts may include nonaqueous materials which decrease the melting point of the oxidizing salt mixture. Various eutectic combinations of oxidizing salts may be used. In addition to the salts, other ingredients may be added to the oxidizer melt such as perchlorate adducts of amines, urea nitrate, urea perchlorate, nitroguanidine, guanidine nitrate and guanidine perchlorate. Occasionally, polyols such as ethylene glycol and glycerol may be added to the molten inorganic oxidizer salts. When glycols are used, in addition to lowering the melting point of the salt, they become part of the fuel for the explosive reaction. Melt-in-fuel emulsion explosives are the subject of numerous patents, and the method of forming suitable melts of oxidizer salts, as well as forming emulsions of such melts in a continuous oil phase are well known to those skilled in the art.

(D) Sensitizers

There are several optional techniques for assuring that explosive emulsions will properly detonate. In one embodiment of the invention, closed-cell, void-containing materials are used as sensitizing components. The term "closed-cell, void-containing material" is used herein to mean any particulate material which comprises closed cell, hollow cavities. Each particle of the material can contain one or more closed cells, and the cells can contain a gas, such as air, or can be evacuated or partially evacuated. In one embodiment of the invention, sufficient closed cell, void containing material is used to yield a density in the resulting emulsion of from about 0.8 to about 1.35 g/cc, more preferably about 0.9 to about 1.3 g/cc, more preferably about 1.0 to about 1.1 g/cc. In general, the emulsions of the subject invention can contain up to about 15% by weight, preferably from about 0.25% to about 15% by weight of the closed cell void containing material. Preferred closed cell void containing materials are discrete glass spheres having a particle size within the range of about 10 to about 175 microns. In general, the bulk density of such particles can be within the range of about 0.1 to about 0.4 g/cc. Useful glass microbubbles or microballoons which can be used are the microbubbles sold by 3M Company and which have a particle size distribution in the range of from about 10 to about 160 microns and a nominal size in the range of about 60 to 70 microns, and densities in the range of from about 0.1 to about 0.4 g/cc. Microballoons identified by the industry designation C15/250 which have a particle density of 0.15 gm/cc and 10% of such microballoons crush at a static pressure of 1724 kPa (250 psig) can be used. Also, microballoons identified by the designation B37/2000 which have a particle density of 0.37 gm/cc and 10% of such microballoons crush at a static pressure of 13789 kPa (2000 psig) can be used. Other useful glass microballoons are sold under the trade designation of ECCOSPHERES by Emerson & Cumming, Inc., and generally have a particle size range from about 44 to about 175 microns and a bulk density of about 0.15 to about 0.4 g/cc. Other suitable microballoons include the inorganic microspheres sold under the trade designation of Q-CEL by Philadelphia Quartz Company.

The closed cell, void containing material can be made of inert or reducing materials. For example, phenol-formaldehyde microbubbles can be utilized within the scope of this invention. If the phenol-formaldehyde microbubbles are utilized, the microbubbles themselves are a fuel component for the explosive and their fuel value should be taken into consideration when designing a water-in-oil emulsion explosive composition. Another closed cell, void containing material which can be used within the scope of the subject invention is the SARAN® microspheres sold by Dow Chemical Company. The Saran microspheres have a diameter of about 30 microns and a particle density of about 0.032 g/cc. Because of the low bulk density of the saran microspheres, it is preferred that only from about 0.25 to about 1% by weight thereof be used in the water-in-oil emulsions of the subject invention.

Many of the closed cell, void containing, materials are somewhat costly. Accordingly, a lower cost means for generating gas bubbles is often preferred. Chemical gassing in situ is frequently employed. Gas bubbles are generated in-situ by adding to the composition and distributing therein a gas-generating material such as, for example, an aqueous solution of sodium nitrite, often in combination with sodium thiocyanate or thiourea, to sensitize the explosive emulsions. Within minutes of mixing the components, nitrogen bubbles begin to form and the density of the emulsion is thus lowered.

Chemical gassing results in emulsion densities generally corresponding to the values obtained using closed cell void containing materials.

In order to obtain satisfactory chemical gassing and resultant reduction of density of the emulsion, it has heretofore been necessary to reduce the pH of the emulsion. This is commonly accomplished by adding to the composition acidic materials. The acid may be an organic acid or a mineral acid. Commonly used are acetic acid, often with a buffer such as sodium acetate, hydrochloric acid and the like.

There are several disadvantages associated with the need to reduce pH of the emulsion in order to secure satisfactory chemical gassing. These include the inherent danger of utilizing acids, costs associated with the additional materials and handling thereof and frequently, stability of the emulsion is reduced. The use of the nitrogen and transition metal containing compositions as emulsifiers obviates the need to reduce the pH of the emulsion in order to obtain satisfactory chemical gassing and resultant reduction of density of the emulsion.

Other suitable sensitizing components which may be employed alone or in addition to the foregoing include insoluble particulate solid self-explosives or fuel such as, for example, grained or flaked TNT, DNT, RDX and the like, particulate metal fuels such as aluminum, aluminum alloys, silicon and ferro-silicon; and water-soluble and/or hydrocarbon-soluble organic sensitizers such as, for example, amine nitrates, alkanolamine nitrates, hydroxyalkyl nitrates, and the like.

The explosive emulsions of the present invention may be formulated for a wide range of applications. Any combination of sensitizing components may be selected in order to provide an explosive composition of virtually any desired density, weight-strength or critical diameter. The quantity of solid self-explosives or fuels and of water-soluble and/or hydrocarbon-soluble organic sensitizers may comprise up to about 50% by weight of the total explosive composition. The volume of the occluded gas component may comprise up to about 50% of the volume of the total explosive composition.

Supplemental Additives

Supplemental additives may be incorporated in the emulsions of the invention in order to further improve sensitivity, density, strength, rheology and cost of the final explosive. Typical of materials found useful as optional additives include, for example, particulate non-metal fuels such as sulfur, gilsonite and the like; particulate inert materials such as sodium chloride, barium sulphate and the like; thickeners such as guar gum, polyacrylamide, carboxymethyl or ethyl cellulose, biopolymers, starches, elastomeric materials, and the like; crosslinkers for the thickeners such as potassium pyroantimonate and the like; buffers or pH controllers such as sodium borate, zinc nitrate and the like; crystals habit modifiers such as alkyl naphthalene sodium sulphonate and the like; liquid phase extenders such as formamide, ethylene glycol and the like; and bulking agents and additives of common use in the explosives art. The quantities of supplemental additives used may comprise up to about 50% by weight of the total explosive composition.

(C) The Nitrogen and Transition Metal Containing Composition

The nitrogen and transition metal containing compositions serve as the emulsifier for the emulsions of the present invention. The emulsifier comprises from about 5% to about 50% by weight of the total weight of the continuous organic phase. The emulsifier (C) comprises a nitrogen and transition metal containing derivative of a hydrocarbyl substituted, preferably hydrocarbon substituted polycarboxylic acid, preferably a succinic acid, or functional equivalent thereof, selected from the group consisting of (C-1) amide and imide derivatives of transition metal salts, (C-2) metal complexes of non-acidic acylated nitrogen compounds, and (C-3) a mixture of acylated nitrogen compounds and transition metal salts.

The nitrogen and transition metal containing derivative of a polycarboxylic acid is used in an emulsifying amount as explained in greater detail herein.

The emulsifier (C) is preferably oil-soluble. The hydrocarbyl substituent contains from about 16 to about 750 carbon atoms, preferably from about 30 to about 200 carbon atoms. Materials of this type are described by LeSuer in U.S. Pat. Nos. 3,163,603 and 3,306,908.

The emulsifier (C) may be prepared by the process which comprises reacting, at a temperature within the range of from about 20° C. to about 250° C., about two equivalents of a polycarboxylic compound selected from the class consisting of hydrocarbyl-substituted polycarboxylic acids and anhydrides wherein the hydrocarbyl substituent has at least about 16, preferably at least about 30, often at least about 50 carbon atoms, up to about 750, preferably up to about 200, often up to about 100 carbon atoms, about one equivalent of a basic transition metal reactant selected from the class consisting of metals, oxides, hydroxides, carbonates and lower alcoholates and the successive combination of an alkali metal hydroxide and an inorganic transition metal salt selected from the class consisting of halides and nitrates, and from one to about five equivalents of an amine selected from the class consisting of alkylene polyamines and hydroxy alkyl-substituted alkylene polyamines, each as described herein. In the usual case from about one to about two equivalents of amine is used.

In another embodiment, (C) is prepared by reacting one equivalent of a mono transition metal salt of a hydrocarbyl substituted succinic acid, wherein the hydrocarbyl group is as defined hereinabove, with from about 1 to about 5 equivalents of an amine selected from the group consisting of alkylene polyamines and hydroxy alkyl substituted alkylene polyamines having up to eight carbon atoms in the alkylene group and up to about 6 carbon atoms in the hydroxyalkyl group.

In another embodiment, (C) is prepared by reacting one equivalent of a hydrocarbyl substituted succinic acid or anhydride wherein the hydrocarbyl group is as defined hereinabove, with from 1 to about 5 equivalents of an amine selected from the group consisting of alkylene polyamines and hydroxy alkyl substituted alkylene polyamines having up to about 8 carbon atoms, preferably 2 or 3 carbon atoms, in the alkylene group and up to about 6 carbon atoms in the hydroxy alkyl group, heating to effect acylation, removing water to form an acylated amine then reacting the acylated polyamine with about one equivalent of a basic transition metal reactant described hereinabove and the successive combination of an alkali metal hydroxide and an inorganic transition metal salt consisting of halides and nitrates.

In another embodiment, the emulsifier (C) is prepared by mixing together individually prepared acylated nitrogen containing compounds, such as amides, imides, and the like with individually prepared transition metal salts. The transition metal salts may be mono-salts or full salts, preferably mono-salts.

The acylated nitrogen containing compounds are prepared by techniques well known in the art. Such procedures are described in for example, LeSuer, U.S. Pat. No. 3,219,666 and numerous other U.S. patents. Procedures for preparing metal salts of hydrocarbyl group substituted polycarboxylic compounds are described in, for example, U.S. Pat. No. 3,271,310. The metal salts may be acidic salts and neutral salts as described in the U.S. Pat. No. 3,271,310. The individually prepared components are then mixed together to form the emulsifier (C).

The Polycarboxylic Compound

Suitable carboxylic acids or anhydrides are hydrocarbyl substituted, aromatic, cycloaliphatic and aliphatic, preferably oil-soluble acids. Polycarboxylic acids are defined herein as having 2 or more carboxyl groups. In one embodiment, the carboxylic acylating agent is characterized by the presence within its structure of from about 0.8 to about 2 succinic groups per hydrocarbyl substituent. Preferably the hydrocarbyl substituent is aliphatic and contains at least 16 carbon atoms, often from about 30 carbon atoms, more preferably at least about 50 carbon atoms, up to about 750, often to about 200, more preferably, up to about 100 carbon atoms.

Useful acids used to generate the emulsifier (C) may be illustrated by the general formula $$R-(COOH)_n \qquad (II)$$

and the and functional equivalents thereof, such as the corresponding anhydrides, ester acids, or lactone acids thereof, wherein R is a hydrocarbyl group as defined hereinabove. R may be aliphatic, cycloaliphatic, or aromatic, including alkyl, alkenyl, aralkyl and alkaryl, including mixtures of acids containing aliphatic and aromatic groups. Preferably R is an aliphatic group. The subscript 'n' is a number ranging from 2 to about 10, preferably 2 to about 4, more preferably 2 or 3, especially 2. Preferred carboxylic acids include polyolefin substituted succinic acids, succinic anhydrides, ester acids or lactone acids. Mixtures of such acids are also useful. The substituted succinic acids have the formula

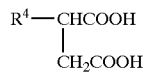

wherein $R^4$ is the same as R as defined above. Also contemplated are the corresponding derivatives, the anhydrides, ester acids, or lactone acids of this succinic acid. $R^4$ is preferably an olefin, preferably alpha-olefin polymer-derived group formed by polymerization of monomers such as ethylene, propylene, 1-butene, isobutene, 1-pentene, 2-pentene, 1-hexene and 3-hexene. Such groups usually contain from about 16, often from about 30, frequently from about 50, up to about 750, often up to about 200, more often up to about 100 carbon atoms. $R^4$ may also be derived from a high molecular weight substantially saturated petroleum fraction. The hydrocarbon-substituted succinic acids and their derivatives constitute the most preferred class of carboxylic acids.

Included among the useful carboxylic reactants are hydrocarbyl substituted cyclohexene dicarboxylic acids and anhydrides which may be obtained from the reaction of e.g., maleic anhydride with an olefin while the reaction mass is being treated with chlorine.

Patents describing useful aliphatic polycarboxylic acids or anhydrides and methods for preparing them include, among numerous others, U.S. Pat. No. 3,163,603 (LeSuer), U.S. Pat. No. 3,215,707 (Rense); U.S Pat. No. 3,219,666 (Norman et al), U.S Pat. No. 3,231,587 (Rense); U.S. Pat. No. 3,306,908 (LSuer); U.S Pat. No. 3,912,764 (Palmer); U.S Pat. No. 4,110,349 (Cohen); and U.S Pat. No. 4,234,435 (Meinhardt et al); and U.K. 1,440,219 which are hereby incorporated by reference for their disclosure of useful carboxylic reactants.

As indicated in the above-mentioned patents, which are hereby incorporated by reference for their disclosure of compounds useful as reactants for preparing the emulsifier (C) of this invention, the carboxylic acids (or various derivatives thereof) include those derived by the reaction of an alpha, beta-unsaturated carboxylic acid containing compound with a polyalkene or halogenated derivative thereof or a suitable olefin.

The polyalkenes from which the carboxylic acids reactants may be derived are homopolymers and interpolymers, also referred to herein as copolymers, of polymerizable olefin monomers of 2 to about 16 carbon atoms; usually 2 to about 6 carbon atoms. The interpolymers are those in which two or more olefin monomers are interpolymerized according to well-known conventional procedures to form polyalkenes having units within their structure derived from each of said two or more olefin monomers. Thus, "interpolymer (s)", or "copolymers" as used herein is inclusive of polymers derived from two different monomers, terpolymers, tetrapolymers, and the like. As will be apparent to those of ordinary skill in the art, the polyalkenes from which the substituent groups are derived are often conventionally referred to as "polyolefin(s)".

The olefin monomers from which the polyalkenes are derived are polymerizable olefin monomers characterized by the presence of one or more ethylenically unsaturated groups (i.e., >C=C<); that is, they are monolefinic monomers such as ethylene, propylene, 1-butene, isobutene, and 1-octene or polyolefinic monomers (usually diolefinic monomers) such as 1,3-butadiene and isoprene.

These olefin monomers are usually polymerizable terminal olefins; that is, olefins characterized by the presence in their structure of the group >C=CH₂. However, polymerizable internal olefin monomers (sometimes referred to in the literature as medial olefins) characterized by the presence within their structure of the group

can also be used to form the polyalkenes. When internal olefin monomers are employed, they normally will be employed with terminal olefins to produce polyalkenes which are interpolymers. For purposes of this invention, when a particular polymerized olefin monomer can be classified as both a terminal olefin and an internal olefin, it will be deemed to be a terminal olefin. Thus, 1,3-pentadiene (i.e., piperylene) is deemed to be a terminal olefin for purposes of this invention.

Polypropylene and polybutylene, particularly polyisobutylene, are preferred. These typically have number average molecular weight ranging from about 300 to about 5,000, more often from about 700 to about 2,000.

A preferred source of hydrocarbyl and hydrocarbon based groups R are polybutenes obtained by polymerization of a $C_4$ refinery stream having a butene content of 35 to 75 weight percent and isobutylene content of 15 to 60 weight percent in the presence of a Lewis acid catalyst such as aluminum trichloride or boron trifluoride. These polybutenes contain predominantly (greater than 80% of total repeating units) isobutylene repeating units of the configuration

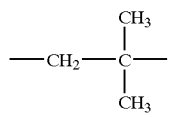

These polybutenes are typically monoolefinic, that is they contain but one olefinic bond per molecule.

The olefinic compound may be a polyolefin comprising a mixture of isomers wherein from about 50 percent to about 65 percent are tri-substituted olefins wherein one substituent contains from 2 to about 500 carbon atoms, often from about 30 to about 200 carbon atoms, more often from about 50 to about 100 carbon atoms, usually aliphatic carbon atoms, and the other two substituents are lower alkyl.

When the olefin is a tri-substituted olefin, it frequently comprises a mixture of cis- and trans- 1-lower alkyl, 1-(aliphatic hydrocarbyl containing from 30 to about 100 carbon atoms), 2-lower alkyl ethene and 1,1-di-lower alkyl, 2-(aliphatic hydrocarbyl containing from 30 to about 100 carbon atoms) ethene.

In one embodiment, the monoolefinic groups are predominantly vinylidene groups, i.e., groups of the formula

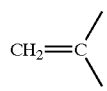

especially those of the formula

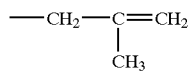

although the polybutenes may also comprise other olefinic configurations.

In one embodiment the polybutene is substantially monoolefinic, comprising at least about 30 mole %, preferably at least about 50 mole % vinylidene groups, more often at least about 70 mole % vinylidene groups. Such materials and methods for preparing them are described in U.S. Pat. Nos. 5,071,919; 5,137,978; 5,137,980; 5,286,823 and 5,408,018, and in published European patent application EP 646103-A1, each of which is expressly incorporated herein by reference. They are commercially available, for example under the tradenames ULTRAVIS® (BP Chemicals) and GLISSOPAL® (BASF).

Specific characterization of olefin reactants (A) used in the processes of this invention can be accomplished by using techniques known to those skilled in the art. These techniques include general qualitative analysis by infrared and determinations of average molecular weight, e.g., $\overline{M}_n$, number average molecular weight, and $\overline{M}_w$, weight average molecular weight, etc. employing vapor phase osmometry (VPO) and gel permeation chromatography (GPC). Structural details can be elucidated employing proton and carbon 13 ($C^{13}$) nuclear magnetic resonance (NMR) techniques. NMR is useful for determining substitution characteristics about olefinic bonds, and provides some details regarding the nature of the substituents. More specific details regarding substituents about the olefinic bonds can be obtained by cleaving the substituents from the olefin by, for example, ozonolysis, then analyzing the cleaved products, also by NMR, GPC, VPO, and by infra-red analysis and other techniques known to the skilled person.

Numerous polycarboxylic acids are commercially available, many from more than one source. The commercially available polycarboxylic acids can be used in the preparation of the compositions of this invention. While these commercially available polyacids, or derivatives thereof that contain the requisite hydrocarbyl substituent may be used by themselves, it is usually beneficial to employ them in combination with polyolefin substituted succinic acids, anhydrides or functional equivalents thereof. Those that do not contain the requisite hydrocarbyl substituent, must be used together with a substituted polycarboxylic acid, usually in amounts that do not exceed about 20 mole % of the total acid functionality. Such commercially available polycarboxylic acids and anhydrides include, but are not limited to aliphatic acids such as glutaric, adipic, sebacic, azaleic, dodecanedioic, 5-norbornene dicarboxylic, bicyclooctene dicarboxylic, 2-OH-succinic, citric, tartaric, cyclopentane tetracarboxylic, 5-norbornene-2,3-dicarboxylic, cyclohexene-4,5-dicarboxylic and cyclohexane dicarboxylic (1,2- 1,3-, and 1,4-). Also useful are aromatic acids and anhydrides such as phthalic, terephthalic, trimellitic anhydride, trimesic, pyromellitic, 2,3-naphthalenedicarboxylic, 1,8-naphthalic, benzophenone tetracarboxylic, and 1,1,3-trimethyl-3-phenylindane-4', 5'-dicarboxylic.

Polycarboxylic acids from vegetable- and animal-sourced carboxylic compounds can be used. Dimer acids, made by the thermal coupling of unsaturated vegetable acids, are available from Emery, Westvaco, Unichema and other companies.

The above-described classes of carboxylic acids derived from olefin polymers, and their derivatives, are well known in the art, and methods for their preparation as well as representative examples of the types useful in the present invention are described in detail in the following U.S. patents:

3,172,892
3,216,936
3,219,666
3,271,310
3,272,746
3,278,550
3,281,428
3,306,908
3,316,771
3,373,111
3,381,022
3,341,542
3,344,170
3,448,048
3,454,607
3,515,669
3,522,179
3,542,678
3,542,680
3,579,450
3,632,510
3,632,511
3,639,242

Other useful acids are hydrocarbyl substituted aromatic polycarboxylic acids such as substituted phthalic acid, mellitic acids, and the like.

Non-limiting examples of polycarboxylic compounds useful to prepare the emulsifier (C) include those in the following examples. Parts in the following examples are, unless otherwise indicated, parts by weight Temperatures are in degrees Celsius (° C.). Filtrations employ a diatomaceous earth filter aid.

EXAMPLE (C-1)-1

A mixture of 6400 parts (4 moles) of a polybutene comprising predominantly isobutene units and having a number average molecular weight of about 1600 and 408 parts (4.16 moles) of maleic anhydride is heated at 225–240° C. for 4 hours. It is then cooled to 170° C. and an additional 102 parts (1.04 moles) of maleic anhydride is added, followed by 70 parts (0.99 mole) of chlorine; the latter is added over 3 hours at 170–215° C. The mixture is heated for an additional 3 hours at 215° C. then vacuum stripped at 220° C. and filtered through diatomaceous earth. The product is the desired polybutenyl-substituted succinic anhydride having a saponification number of 61.8.

EXAMPLE(C-1)-2

A polybutenyl succinic anhydride is prepared by the reaction of a chlorinated (4.3% Cl) polybutylene with maleic anhydride at 200° C. The polybutenyl radical contains an average of about 70 carbon atoms and contains primarily isobutene units. The resulting alkenyl succinic anhydride is found to have an acid number of 103.

EXAMPLE (C-1)-3

A lactone acid is prepared by reacting 2 equivalents of a polyolefin ($\overline{M}_n$ about 900) substituted succinic anhydride with 1.02 equivalents of water at a temperature of about 90° C. in the presence of a catalytic amount of concentrated sulfuric acid. Following completion of the reaction, the sulfuric acid catalyst is neutralized with sodium carbonate and the reaction mixture is filtered.

EXAMPLE (C-1)4

An ester acid is prepared by reacting 2 equivalents of an alkyl substituted succinic anhydride having an average of about 35 carbon atoms in the alkyl group with 1 mole of ethanol.

EXAMPLE (C-1)-5

A reactor is charged with 1000 parts of polybutene having a number average molecular weight determined by vapor phase osmometry of about 950 and which consists primarily of isobutene units, followed by the addition of 108 parts of maleic anhydride. The mixture is heated to 110° C. followed by the sub-surface addition of 100 parts $Cl_2$ over 6.5 hours at a temperature ranging from 110 to 188° C. The exothermic reaction is controlled as not to exceed 188° C. The batch is blown with nitrogen then stored.

EXAMPLE (C-1)-6

A procedure similar to that of Example (C-1)-5 is repeated employing 1000 parts of polybutene having a molecular weight determined by vapor phase osmometry of about 1650 and consisting primarily of isobutene units and 106 parts maleic anhydride. Chlorine (90 parts) is added beginning at 130° C. and added at a nearly continuous rate such that the maximum temperature of 188° C. is reached near the end of chlorination. The residue is blown with nitrogen and collect.

EXAMPLE (C-1)-7

A reactor is charged with 1000 parts of $C_{18-24}$ olefin mixture obtained from Albamarle Corporation, Houston, Tex. The material is heated to 65° C. followed by addition of 350 parts maleic anhydride. The temperature is increased to 213° C. then held at reflux until the total acid number is between 2851–295. The reactor contents are stripped to remove volatile materials until analysis shows % maleic acid is less than 0.30%

EXAMPLE (C-1)-8

A reactor is charged with 1000 parts of a polybutene having a number average molecular weight of about 1500 and 47.9 parts molten maleic anhydride. The materials are heated to 138° C. followed by chlorination, allowing the temperature to rise to between 188–191° C., heating and chlorinating until the acid number is between 43 and 49 (about 40–45 parts $Cl_2$ are utilized). The materials are heated at 224–227° C. for about 2.5 hours until the acid number stabilizes. The reaction product is diluted with 438 parts mineral oil diluent and filtered with a diatomaceous earth filter aid.

Amine Reactants

Suitable amine reactants, as defined herein, include monoamines and polyamines. The amine reactants must contain at least one N—H group. Thus, only amines having primary and secondary amino groups are used in preparing the emulsifiers of this invention. Polyamines may be used and are preferred, provided that they contain at least one primary or secondary amine group. The monoamines generally contain from 1 to about 24 carbon atoms, preferably 1 to about 12, and more preferably 1 to about 6. Examples of monoamines useful in the present invention include primary amines, for example methylamine, ethylamine, propylamine, butylamine, octylamine, and dodecylamine. Examples of secondary amines include dimethylamine, diethylamine, dipropylamine, dibutylamine, methylbutylamine, ethylhexylamine, etc.

In another embodiment, the monoamine may be a hydroxyamine. Typically, the hydroxyamines are primary or secondary alkanolamines or mixtures thereof. Alkanol amines that can react to form amide can be represented, for example, by the formulae:

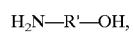

and

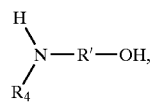

wherein each $R_4$ is independently a hydrocarbyl group of one to about 22 carbon atoms or hydroxyhydrocarbyl group of two to about 22 carbon atoms, preferably one to about four, and R' is a divalent hydrocarbyl group of about two to about 18 carbon atoms, preferably two to about four. The group —R'—OH in such formulae represents the hydroxyhydrocarbyl group. R' can be an acyclic, alicyclic or aromatic group. Typically, R' is an acyclic straight or branched alkylene group such as an ethylene, 1,2-propylene, 1,2-butylene, 1,2-octadecylene, etc. group. When two $R^4$ groups are present in the same molecule they can be joined by a direct carbon-to-carbon bond or through a heteroatom (e.g., oxygen, nitrogen or sulfur) to form a 5-, 6-, 7- or 8-membered ring structure. Examples of such heterocyclic amines include N-(hydroxyl lower alkyl)-morpholines, -thiomorpholines, -piperidines, -oxazolidines, -thiazolidines and the like. Typically, however, each $R^4$ is independently a methyl, ethyl, propyl, butyl, pentyl or hexyl group.

Examples of these alkanolamines include mono- and di-ethanolamine, ethylethanolamine, etc.

The hydroxyamines can also be ether N-(hydroxyhydrocarbyl) amines. These are hydroxy poly (hydrocarbyloxy) analogs of the above-described hydroxy amines (these analogs also include hydroxyl-substituted oxyalkylene analogs). Such N-(hydroxyhydrocarbyl)amines can be conveniently prepared, for example, by reaction of epoxides with aforedescribed amines and can be represented by the formulae:

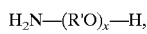

and

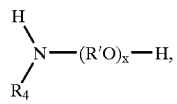

wherein x is a number from about 2 to about 15 and $R_4$ and R' are as described above. $R_4$ may also be a hydroxypoly (hydrocarbyloxy) group.

Other useful amines include ether amines of the general formula

wherein $R_6$ is a hydrocarbyl group, preferably an aliphatic group, more preferably an alkyl group, containing from 1 to about 24 carbon atoms, $R^1$ is a divalent hydrocarbyl group, preferably an alkylene group, containing from two to about 18 carbon atoms, more preferably two to about 4 carbon atoms and $R_7$ is H or hydrocarbyl, preferably H or aliphatic, more preferably H or allyl, more preferably H. When $R_7$ is not H, then it preferably is alkyl containing from one to about 24 carbon atoms. Especially preferred ether amines are those available under the name SURFAM produced and marketed by Sea Land Chemical Co., Westlake, Ohio.

The amine is preferably a polyamine. The polyamine may be aliphatic, cycloaliphatic, heterocyclic or aromatic. Examples of the polyamines include alkylene polyamines, hydroxy containing polyamines, arylpolyamines, and heterocyclic polyamines.

Alkylene polyamines are represented by the formula

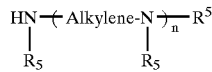

wherein n has an average value between about 1 and about 10, preferably about 2 to about 7, more preferably about 2 to about 5, and the "Alkylene" group has from 1 to about 10 carbon atoms, preferably about 2 to about 6, more preferably about 2 to about 4. $R_5$ is independently hydrogen or an aliphatic, amino-substituted aliphatic or hydroxy-substituted aliphatic group of up to about 30 carbon atoms. Preferably $R_5$ is H or lower alkyl, most preferably, H.

Alkylene polyamines include methylene polyamines, ethylene polyamines, butylene polyamines, propylene polyamines, pentylene polyamines, etc. Higher homologs and related heterocyclic amines such as piperazines and N-amino alkyl-substituted piperazines are also included. Specific examples of such polyamines are ethylene diamine, diethylene triamine, triethylene tetramine, tris-(2-aminoethyl)amine, propylene diamine, trimethylene diamine, tripropylene tetramine, tetraethylene pentamine, hexamethylene heptamine, pentaethylenehexamine, aminoethyl piperazine, dimethyl aminopropylamine, etc.

Higher homologs obtained by condensing two or more of the above-noted alkylene amines are similarly useful as are mixtures of two or more of the aforedescribed polyamines.

Ethylene polyamines, such as some of those mentioned above, are preferred. They are described in detail under the heading "Diamines and Higher Amines" in Kirk Othmer's "Encyclopedia of Chemical Technology", 4th Edition, Vol. 8, pages 74–108, John Wiley and Sons, New York (1993) and in Meinhardt et al, U.S. Pat. No. 4,234,435, both of which are hereby incorporated herein by reference for disclosure of useful polyamines. Such polyamines are conveniently prepared by the reaction of ethylene dichloride with ammonia or by reaction of an ethylene imine with a ring opening reagent such as water, ammonia, etc. These reactions result in the production of a complex mixture of polyalkylene polyamines including cyclic condensation products such as the aforedescribed piperazines. Ethylene polyamine mixtures are useful.

Other useful types of polyamine mixtures are those resulting from stripping of the above-described polyamine mixtures to leave as residue what is often termed "polyamine bottoms". In general, alkylene polyamine bottoms can be characterized as having less than two, usually less than 1% (by weight) material boiling below about 200° C. A typical sample of such ethylene polyamine bottoms obtained from the Dow Chemical Company of Freeport, Tex., designated "E-100" has a specific gravity at 15.6° C. of 1.0168, a percent nitrogen by weight of 33.15 and a viscosity at 40° C. of 121 mm²/s (centistokes). Gas chromatography analysis of such a sample contains about 0.93% "Light Ends" (most probably diethylenetriamine), 0.72% triethylenetetramine, 21.74% tetraethylenepentamine and 76.61% pentaethylene hexamine and higher (by weight). These alkylene polyamine bottoms include cyclic condensation products such as piperazine and higher analogs of diethylenetriamine, triethylenetetramine and the like.

Another useful polyamine is a condensation product obtained by reaction of at least one hydroxy compound with at least one polyamine reactant containing at least one primary or secondary amino group. The hydroxy compounds are preferably polyhydric alcohols and amines. Preferably the hydroxy compounds are polyhydric amines. Polyhydric amines include any of the above-described monoamines reacted with an alkylene oxide (e.g., ethylene oxide, propylene oxide, butylene oxide, etc.) having two to about 20 carbon atoms, preferably two to about four. Examples of polyhydric amines include tri-(hydroxypropyl) amine, tris-(hydroxymethyl)amino methane, 2-amino-2-methyl-1,3-propanediol, N,N,N',N'-tetrakis(2-hydroxypropyl)ethylenediamine, and N,N,N',N'-tetrakis(2-hydroxyethyl)ethylenediamine.

Polyamine reactants, which react with the polyhydric alcohol or amine to form the condensation products or condensed amines, are described above. Preferred polyamine reactants include triethylenetetramine (TETA), tetraethylenepentamine (TEPA), pentaethylenehexamine (PEHA), and mixtures of polyamines such as the above-described "amine bottoms".

The condensation reaction of the polyamine reactant with the hydroxy compound is conducted at an elevated temperature, usually about 60° C. to about 265° C. in the presence of an acid catalyst.

The amine condensates and methods of making the same are described in Steckel (U.S. Pat. No. 5,053,152) which is incorporated by reference for its disclosure to the condensates and methods of making amine condensates.

In another embodiment, the polyamines are hydroxy-containing polyamines. Hydroxy-containing polyamine analogs of hydroxy monoamines, particularly alkoxylated alkylenepolyamines can also be used. Such polyamines can be made by reacting the above-described alkylene amines with one or more of the above-described alkylene oxides. Similar alkylene oxide-alkanolamine reaction products can also be used such as the products made by reacting the aforedescribed primary, secondary or tertiary alkanolamines with ethylene, propylene or higher epoxides in a 1.1 to 1.2 molar ratio. Reactant ratios and temperatures for carrying out such reactions are known to those skilled in the art.

Specific examples of alkoxylated alkylenepolyamines include N-(2-hydroxyethyl) ethylenediamine, N,N-di-(2-hydroxyethyl)-ethylenediamine, I-(2-hydroxyethyl) piperazine, mono(hydroxypropyl)-substituted tetraethylenepentamine, N-(3-hydroxybutyl)-tetramethylene diamine, etc. Higher homologs obtained by condensation of the above illustrated hydroxy-containing polyamines through amino groups or through hydroxy groups are likewise useful. Condensation through amino groups results in a higher amine accompanied by removal of ammonia while condensation through the hydroxy groups results in products containing ether linkages accompanied by removal of water. Mixtures of two or more of any of the aforesaid polyamines are also useful.

In another embodiment, the polyamine may be a heterocyclic polyamine. The heterocyclic polyamines include aziridines, azetidines, azolidines, tetra- and dihydropyridines, pyrroles, indoles, piperidines, imidazoles, di- and tetrahydroimidazoles, piperazines, isoindoles, purines, N-aminoalkylthiomorpholines, N-aminoalkylmorpholines, N-aminoalkylpiperazines, N,N'-bisaminoalkyl piperazines, azepines, azocines, azonines, azecines and tetra-, di- and perhydro derivatives of each of the above and mixtures of two or more of these heterocyclic amines. Preferred heterocyclic amines are the saturated 5- and 6-membered heterocyclic amines containing only nitrogen, or nitrogen with oxygen and/or sulfur in the hetero ring, especially the piperidines, piperazines, thiomorpholines, morpholines, pyrrolidines, and the like. Piperidine, aminoalkylsubstituted piperidines, piperazine, aminoalkylsubstituted piperazines, morpholine, aminoalkyl-substituted morpholines, pyrrolidine, and aminoalkyl-substituted pyrrolidines, are especially preferred. Usually the aminoalkyl substituents are substituted on a nitrogen atom forming part of the hetero ring. Specific examples of such heterocyclic amines include N-aminopropylmorpholine, N-amino-ethylpiperazine, and N,N'-diaminoethyl-piperazine. Hydroxy alkyl substituted heterocyclic polyamines are also useful. Examples include N-hydroxyethylpiperazine and the like.

In another embodiment, the amine is a polyalkene-substituted amine. These polyalkene-substituted amines are well known to those skilled in the art. They are disclosed in U.S. Pat. Nos. 3,275,554; 3,438,757; 3,454,555; 3,565,804; 3,755,433; and 3,822,289. These patents are hereby incorporated by reference for their disclosure of polyalkene-substituted amines and methods of making the same.

Typically, polyalkene-substituted amines are prepared by reacting halogenated-, preferably chlorinated-, olefins and olefin polymers (polyalkenes) with amines (mono- or polyamines). The amines may be any of the amines described above. Examples of these compounds include poly(propylene)amine; N,N-dimethyl-N-poly(ethylene/propylene)amine, (50:50 mole ratio of monomers); poly-butene amine; N,N-di(hydroxyethyl)-N-polybutene amine; N-(2-hydroxypropyl)-N-polybutene amine; N-polybutene-aniline; N-polybutene-morpholine; N-poly(butene) ethylenediamine; N-poly(propylene)trimethylenedi-amine; N-poly(butene)diethylene-triamine; N',N'-poly(butene) tetraethylene-pentamine; N,N-dimethyl-N'-poly-(propylene)-1,3-propylenediamine and the like.

The polyalkene substituted amine is characterized as containing from at least about 8 carbon atoms, preferably at least about 30, more preferably at least about 35 up to about 300 carbon atoms, preferably 200, more preferably 100. In one embodiment, the polyalkene substituted amine is characterized by $\overline{M}$ n (number average molecular weight) value of at least about 500. Generally, the polyalkene substituted amine is characterized by an n value of about 500 to about 5000, preferably about 800 to about 2500. In another embodiment n varies between about 500 to about 1200 or 1300.

The polyalkenes from which the polyalkene substituted amines are derived include homopolymers and interpolymers of polymerizable olefin monomers of 2 to about 16 carbon atoms; usually 2 to about 6, preferably 2 to about 4, more preferably 4. The olefins may be monoolefins such as ethylene, propylene, 1-butene, isobutene, and 1-octene; or a polyolefinic monomer, preferably diolefinic monomer, such 1,3-butadiene and isoprene. Preferably, the polymer is a homopolymer. An example of a preferred homopolymer is a polybutene, preferably a polybutene in which about 50% of the polymer is derived from isobutylene. The polyalkenes are prepared by conventional procedures.

The number of equivalents of acylating agent depends on the total number of carboxylic functions present. In the determination of the number of equivalents of acylating agent, carboxyl functions which are not capable of reacting as a carboxylic acid acylating agent are excluded. In general, there is one equivalent of acylating agent for each carboxy group in the acylating agents. Conventional methods for determining the number of carboxyl functions (e.g., acid number, saponification number, etc.) are available and are well known to those skilled in the art.

An equivalent weight of monoamine is the molecular weight of the amine. The equivalent weight of mixtures of monoamines can be determined by dividing the atomic weight of nitrogen (14) by the %N contained in the mixture and multiplying by 100. Equivalent weight of polyamines can be determined similarly.

Amounts of polyamines are often referred to in equivalents. One equivalent of a polyamino compound or derivative thereof is its formula weight divided by the average number of nitrogen atoms therein which contain a basic N—H group. Thus ethylene diamine contains 2 equivalents; N,N-dimethyl-propanediamine contains one equivalent.

In another embodiment, the polyamine may be a hydroxyamine provided that the polyamine contains at least one condensable —N—H group. Typically, the hydroxyamines are primary or secondary alkanol amines or mixtures thereof. Such amines can be represented by mono- and poly-N-hydroxyalkyl substituted alkylene polyamines wherein the alkylene polyamines are as described hereinabove; especially those that contain two to three carbon atoms in the alkylene radicals and the alkylene polyamine contains up to seven amino groups.

Acylated amines useful in the preparation of the emulsifier (C) include, but are not limited by, those prepared by the processes described in the following examples:

EXAMPLE (C-2)-1

A reaction flask is charged with 698 parts of mineral oil and 108 parts of a commercial polyethylene polyamine mixture having typical %N=34. The materials are stirred and heated to 135° C. at which time 1000 parts of a polybutene substituted succinic anhydride prepared according to the procedure of Example (C-1)-1 are added over 1 hour. With $N_2$ sparging, the temperature is increased to 160° C. and held there for 4 hours while removing water and other volatile components. The product is filtered using a diatomaceous earth filter aid yielding a filtrate typically containing 2% N and a total base number of 45.

EXAMPLE (C-2)-2

A polybutene having a number average molecular weight=1350 (1000 parts) is reacted with 106 parts maleic anhydride with $Cl_2$ blowing (total $Cl_2$ about 90 parts). To a reactor containing 1000 parts of the substituted succinic anhydride is added 1050 parts mineral oil, the materials are heated, with mixing, to 120° C., followed by addition of 70 parts of the commercial amine mixture described in Example (C-2)-1. The reaction mixture is heated to 155° C. over 4 hours with $N_2$ sparging to remove volatiles then filtered employing a diatomaceous earth filter aid. The filtrate typically contains, by analysis, 1.1%N and has a total base number=20.

EXAMPLE (C-2)-3

An acylated polyamine is prepared by reacting 1000 parts of polyisobutenyl ($\overline{M}_n$ 1000) substituted succinic anhydride with 85 parts of a commercial ethylene polyamine mixture having an average nitrogen content of about 34.5% in 820 parts mineral oil diluent under conditions described in LeSuer U.S. Pat. No. 3,172,892.

EXAMPLE (C-2)-4

A composition is prepared by reacting a mixture of 275 parts mineral oil, 147 parts of a commercial ethyleneamine mixture having an average composition corresponding to that of tetraethylenepentamine and 1000 parts of polyisobutene ($\overline{M}_n \approx 1000$) substituted succinic anhydride at 120–125° C. for 2 hours and at 150° C. for 2 hours then blown with nitrogen at 150° C. for 5 hours to form an acylated amine.

EXAMPLE (C-2)-5

A solution of 698 parts mineral oil and 108 parts commercial ethylene polyamine mixture containing an average of about 34% nitrogen is prepared and heated to 115° C. To the oil solution is added 1000 parts of the polybutenyl-substituted succinic anhydride of Example (C-1)-3 under $N_2$ followed by heating to 150° C. The reaction is continued at 143–150° C. for 1 hour. The product is then filtered

EXAMPLE (C-2)-6

The procedure of Example (C-2)-2 is repeated except the polybutenyl group on the substituted succinic anhydride is derived from a polyisobutene having a number average molecular weight, measured by vapor phase osmometry, of about 1700.

EXAMPLE (C-2)-7

To a mixture of 300 parts of the anhydride of Example (C-1)-2 in 160 parts mineral oil are added, at 65–95° C., 25 parts of the ethylene polyamine mixture of Example (C-2)-4 followed by heating to 150° C. with $N_2$ blowing to dry the material, then diluted with 79 parts mineral oil.

EXAMPLE (C-2)-8

A non-acidic nitrogen intermediate is prepared by reacting 2178 parts of the polybutenyl succinic anhydride of example (C-1)-2 and 292 parts of triethylene tetramine in 1555 parts mineral oil at 215° C. for 12 hours, removing aqueous distillate.

The Transition Metal Reactant

The metals of the metal salts useful in this invention are those metals selected from the class consisting of transition metals, preferably those from the first transition group of the Periodic Table of Elements. Preferred are copper and zinc; zinc is particularly preferred Examples of metal compounds contemplated as reactants in the preparation of the emulsifier (C) are the transition metal oxides, hydroxides, carbonates, methylates, propylates, pentylates, and phenoxides.

Amounts of metal reactant are often referred to in terms of equivalents. An equivalent of metal is defined herein as the formula weight of the metal divided by its valence. Therefore, one equivalent of sodium is equal to its formula weight, one equivalent of zinc is equal to one-half of its formula weight, one equivalent of aluminum is one-third of its formula weight. Similarly for ions, one equivalent of cupric ion is its formula weight divided by 2, one equivalent of cuprous ion is its formula weight.

The following examples illustrate process for preparing nitrogen and metal containing derivatives (C) used as emulsifiers in the preparation of the emulsions of this invention. Unless indicated otherwise, all parts are parts by weight, temperatures are in degrees Celsius and pressures are atmospheric. All analytical values are by analysis. Filtrations employ a diatomaceous earth filter aid. These examples are intended to be illustrative only and are not intended to limit the scope of the invention.

EXAMPLE C-1

To a mixture of 3264 parts of the anhydride of Example (C-1)-2, 2420 parts mineral oil and 75 parts water are added, in three portions over 0.5 hours at 80–100° C., 122.1 parts zinc oxide. The materials are reacted for 3 hours at 90–100° C. then the temperature is increased to 150° C. and maintained at this temperature until essentially dry. The materials are cooled to 100° C. then there is added, portionwise over 0.5 hours, 245 parts of an ethylene polyamine mixture having an average composition corresponding to tetraethylene pentamine and an average equivalent weight of 40.8. The materials are heated to 150° C. and are maintained at 150° C.–160° C. for 5 hours while $N_2$ blowing to remove water. The materials are filtered. The filtrate contains 1.63% Zn and 1.39% N.

EXAMPLE C-2

To a mixture of 80 parts water, 36.5 parts zinc oxide and 650 parts mineral oil are added, as fast as possible without allowing the exothermic reaction to exceed 93° C., 1000 parts of the anhydride of Example (C-1)-5. The materials are reacted for 1.5 hours at 87° C.–93° C., then heated to 121° C. To this material are added 36 parts of an ethylene polyamine mixture containing about 34% N followed by heating to 148° C. the $N_2$ blowing at 148–155° C. to 0.3% maximum water content and filtration. Mineral oil is added to adjust % Zn to 1.55.

EXAMPLE C-3

A mixture of 357 parts cobaltous chloride hexahydrate, 2800 parts of the product of Example (C-2)-7 and 250 parts xylene are heated under reflux while removing water by azeotropic distillation. The residue is heated fof 2 hours, mixed with 560 parts mineral oil and filtered. The filtrate is heated to remove xylene and the residue is filtered yielding a 50% in oil solution of a metal complex containing 1.2% Co.

EXAMPLE C-4

The procedure of Example C-2 is repeated employing 1000 parts of an 80% in mineral oil solution of the anhydride of Example (C-1)-5, 64 parts water, 29.2 parts zinc oxide and 28.8 parts of ethylene polyamine mixture. After filtration the materials are diluted with 132 parts additional mineral oil.

EXAMPLE C-5

An acylated nitrogen-containing compound is prepared by reacting 2076 parts of the anhydride of example (C-1)-1 and 292 parts triethylene tetramine in 1555 parts mineral oil at 215° C. while removing water, then the materials are filtered. A mixture of 485 parts of the filtrate is reacted with 74 parts zinc dihydrogen phosphate dihydrate in 51 parts mineral oil at 160° C. for 14.5 hours, mixed with 250 parts by volume xylene, then filtered. The filtrate is stripped to 130° C. at 2 kPa (15 mm Hg), then filtered again.

EXAMPLE C-6

The procedure of Example 2 is repeated replacing the succinic anhydride of Example (C-1)-5 with a stoichiometric equivalent amount of the anhydride of example (C-1)-6

EXAMPLE C-7

To 440 parts of the product of example (C-2)-8 are added at 140–150° C., over 6 hours, 324 parts of cupric benzoate. The mixture is heated at 140–150° C. for 3 hours, filtered, then stripped to 65° C. at 4.6 kPa (35 mm Hg) and again filtered.

EXAMPLE C-8

The procedure of Example C-2 is repeated replacing zinc oxide with an equivalent amount of zinc as zinc borate.

The Co-emulsifier

The co-emulsifier typically has hydrophilic-lipophilic balance (HBL) ranging from about 1 to about 6. From about 1%, often from about 5% to about 50% by weight of co-emulsifier, based on total emulsifier content, may be used together with the emulsifier (C) used in this invention. Co-emulsifiers are used, for example, to enhance emulsion stability. Any water in oil emulsifier suitable for use in the particular application may be used as a co-emulsifier to prepare the emulsions of this invention. Any emulsifier which together with component (C) serves to establish the requisite water in oil emulsion and is stable to the conditions under which the emulsion is formed, may be used in the present invention. Such emulsifiers generally consist of lipophilic and hydrophilic portions.

The lipophilic portion of the co-emulsifier may be either monomeric or polymeric in nature. Examples of suitable chain structures include those described as hydrocarbyl groups of the polycarboxylic acids used to prepared the emulsifiers (C) of this invention. These co-emulsifiers include the internal amine salts, ester salts, and the like which are well known in the art and which are mentioned in several of the patents referred to in the Background of the Invention of this patent application.

The following example illustrates a representative co-emulsifier that may be used to prepare the emulsions of this invention.

Co-emulsifier 1

A reactor is charged with 1151 parts mineral oil (Naphthenic pale 40N, Diamond Shamrock) which is heated to 66° C. While maintaining this temperature, 1000 parts of the product of Example (C-1)-6 are added and the materials are mixed thoroughly. Dimethylethanol amine (151 parts) is then added at such a rate that the batch temperature exotherms to 82° C. The batch is heated to 93° C. and is held at temperature for 2 hours. The batch is heated to 160° C. and is maintained at temperature until the total acid number is 13. The batch is then filtered.

Other suitable co-emulsifiers include salts of hydrocarbyl group substituted succinic acylating agents, salts of partially esterified hydrocarbyl group substituted poly-acids, sorbitan esters, such as sorbitan sesquioleate, sorbitan monooleate, sorbitan monopalmitate, the mono- and diglycerides of fat forming fatty acids, soybean lecithin and derivatives of lanolin such as isopropyl esters of lanolin fatty acids, mixtures of higher molecular weight fatty alcohols and wax esters, ethoxylated fatty ethers such as polyoxyethylene(4) lauryl ether, and oxazoline emulsifiers such as substituted oxazolines such as 2-oleyl-4-4'-bis(hydroxymethyl)-2-oxazoline and suitable mixtures thereof.

Method of Making the Emulsions

A useful method for preparing the emulsions of this invention comprises combining the organic components such as oil with the emulsifier to form a premix and combining the premix with the materials making up the discontinuous phase. As noted hereinabove, the discontinuous phase may comprise a substantially anhydrous molten oxidizer or may be an aqueous composition comprising water and one or more water soluble components such as oxidizing agents or fertilizer components.

One useful method for making the explosive emulsions of the invention comprises the steps of (1) mixing water, inorganic oxidizer salts (e.g., ammonium nitrate) and, in certain cases, some of the supplemental water-soluble compounds, in a first premix, (2) mixing the carbonaceous fuel, the emulsifier of the invention and any other optional oil-soluble compounds, in a second premix and (3) adding the first premix to the second premix in a suitable mixing apparatus, to form a water-in-oil emulsion. The first premix is heated until all the salts are completely dissolved and the solution may be filtered if needed in order to remove any insoluble residue. The second premix is also heated to liquefy the ingredients. Any type of apparatus capable of either low or high shear mixing can be used to prepare these water-in-oil emulsions. Closed-cell, void containing materials, gas-generating materials, solid self-explosive ingredients such as particulate TNT, particulate-solid oxygen-supplying salts such as ammonium nitrate prills and ANFO, solid fuels such as aluminum or sulfur, inert materials such as barites or sodium chloride, undissolved solid oxidizer salts and other optional materials, if employed, are added to the emulsion and simply blended until homogeneously dispersed throughout the composition.

The water-in-oil explosive emulsions of the invention can also be prepared by adding the second premix liquefied organic solution phase to the first premix hot aqueous solution phase with sufficient stirring to invert the phases. However, this method usually requires substantially more energy to obtain the desired dispersion than does the preferred reverse procedure. Alternatively, these water-in-oil explosive emulsions are particularly adaptable to preparation by a continuous mixing process where the two separately prepared liquid phases are pumped through a mixing device wherein they are combined and emulsified.

The emulsifiers of this invention can be added directly to the other components of the emulsion. They can also be diluted with a substantially inert, normally liquid organic diluent such as mineral oil, naphtha, benzene, toluene or xylene, to form an additive concentrate. These concentrates usually contain from about 10% to about 90% by weight of the emulsifier composition of this invention and may contain, in addition, one or more other additives known in the art or described herein.

The following examples illustrate emulsions of this invention. Unless otherwise indicated, all parts are parts by weight (pbw). Temperatures are in degrees Celsius. Unless otherwise indicated, amounts of ingredients are as prepared or as available, without adjusting for oil or other diluent content.

EXAMPLES 1–2

An organic mixture is prepared by mixing at about 70° C., 19.34 parts of the product of Example C-2, 2.15 parts of the product of the Co-emulsifier 1 example, and 45.71 parts Diesel fuel oil. A solution of 928.9 parts ammonium nitrate in 203.9 parts water is prepared. A base emulsion is prepared by adding the water solution to the organic solution over 1 minute in a food processor at 45% of full voltage. After addition is completed, the speed is increased to 65% of full voltage and is maintained for 1.5 minutes.

Using this base emulsion, two sensitized explosive emulsions are prepared. The first is prepared by combining 200 parts of the base emulsion with 2 parts of a 15% aqueous solution of sodium nitrite. This is identified as Example 1. The second emulsion is prepared by combining 200 parts of the base emulsion with 2 parts of an aqueous solution containing 15 parts by weight sodium nitrite and 30 parts by weight sodium thiocyanate. This emulsion is identified as Example 2.

Comparative Examples

Comparative emulsions are prepared. Each is prepared replacing the emulsifiers of Examples 1 and 2 with equal weight (on a neat, diluent free basis) of prior art emulsifiers. The first, identified as Comp. 1, is prepared as in Example 1 replacing the emulsifiers of that example with 1 part by weight (neat chemical basis) per 100 parts of emulsion of the product of Example (C-2)-3. The second is prepared replacing the emulsifiers of Example 1 with 1 part by weight (neat chemical basis) per 100 parts of emulsion of the product of the Co-emulsifier 1 example.

The emulsion densities (g/cm$^3$) of the emulsions of the comparative examples and the emulsion of Example 1 are measured over time. Emulsion density is measured by obtaining the weight of fixed volumes of the emulsion. The data are provided in the following table:

| Emulsion: Time (min.) | Emulsion Density (g/cm$^3$) Comp 1 | Comp 2 | Example 1 |
| --- | --- | --- | --- |
| 1 | 1.29 | 1.30 | 1.30 |
| 5 | — | 1.30 | 1.23 |
| 15 | 1.29 | 1.30 | 1.11 |
| 30 | 1.29 | 1.30 | 1.10 |
| 1440 | 1.29 | 1.29 | 0.99 |

As is apparent from the foregoing data, the density of the emulsion of the instant invention (Example 1) is reduced without the need to acidify the emulsion. The density of prior art emulsions (Comp 1 and Comp 2) remains essentially unchanged.

In the preceding examples, the emulsifier of the instant invention contains both a metal and nitrogen containing emulsifier and a co-emulsifier. In the following examples, the effects of pH and of relative amounts of co-emulsifier (the product of the Co-emulsifier 1 example) and of metal and nitrogen containing emulsifier (Product of Example C-2) are examined. The active emulsifier is the total weight of emulsifier on a neat chemical basis.

The emulsion compositions are as follows:

|  | High pH | Low pH |
| --- | --- | --- |
| Ammonium nitrate | 77.408 | 77.304 |
| Sodium acetate |  | 0.038 |
| Acetic acid |  | 0.066 |
| Water | 16.992 | 16.992 |
| Active emulsifier | 1.000 | 1.000 |
| Diesel fuel | 4.600 | 4.600 |

The aqueous phase of the high pH (5) emulsion is prepared from ammonium nitrate and water. The aqueous phase of the low pH (2.5) emulsion is prepared from water, ammonium nitrate, sodium acetate and acetic acid. The aqueous phase is prepared by mixing the components at 85° C. The organic phase of these emulsions is prepared by mixing the diesel fuel with the emulsifier at 70° C. It should be noted that the emulsifier also contributes about 1 part by weight of mineral oil which also serves as additional fuel. The metal and nitrogen containing emulsifier is that of Example C-2. The co emulsifier is the product of the Co-emulsifier 1 example.

In each example, the emulsifier and diesel fuel are mixed in a food processor at 70° C. and the aqueous solution is added over 1 minute while mixing at 45% full voltage on the food processor. When the addition is completed, the voltage is increased to 65%, increasing the speed of the processor and the emulsion is mixed for 1.5 minutes. The gassing reaction is carried out by rapidly stirring 2 parts of an aqueous 15% sodium nitrite/30% sodium thiocyanate solution into 200 parts of each base emulsion. Each emulsion is transferred to a vessel of known volume and as gassing progresses, the volume increases. Excess emulsion is scraped off the top of the vessel and the vessel is weighed at each time interval allowing calculation of the emulsion density.

Emulsion densities of several emulsions are given in the following table. The percentage is the weight percent, based on the total weight of emulsifier in the emulsion, of metal and nitrogen containing emulsifier. Thus, 100% indicates the emulsifier is totally the product of Example C-2 and 0% indicates that the emulsifier is 100% of the product of the Co-emulsifier 1 example.

| % | pH | Time (min) | Density g/cm$^3$ |
| --- | --- | --- | --- |
| 100% | low | 1 | 1.25 |
|  |  | 5 | 0.97 |
|  |  | 15 | 0.92 |
| 100% | high | 1 | 1.30 |
|  |  | 5 | 1.15 |
|  |  | 15 | 1.03 |
|  |  | 30 | 1.01 |
| 90% | low | 1 | 1.24 |
|  |  | 5 | 0.98 |
|  |  | 15 | 0.91 |

-continued

| % | pH | Time (min) | Density g/cm³ |
|---|---|---|---|
| 90% | high | 1 | 1.31 |
|  |  | 5 | 1.23 |
|  |  | 15 | 1.10 |
|  |  | 30 | 1.07 |
| 80% | low | 1 | 1.26 |
|  |  | 5 | 1.04 |
|  |  | 15 | 1.00 |
| 80% | high | 1 | 1.30 |
|  |  | 5 | 1.23 |
|  |  | 15 | 1.10 |
|  |  | 30 | 1.09 |
| 66% | low | 1 | 1.31 |
|  |  | 5 | 1.27 |
|  |  | 15 | 1.23 |
|  |  | 30 | 1.21 |
|  |  | 1080 | 1.11 |
| 0% | low | 1 | 1.31 |
|  | low | 5 | 1.31 |
|  |  | 15 | 1.31 |
| 0% | high | 1 | 1.31 |
|  |  | 5 | 1.31 |
|  |  | 15 | 1.31 |

From the foregoing data it is apparent that emotions of the instant invention are superior with respect to density reduction compared to emulsions of the prior art (0% N—and metal containing emulsifier).

It is known that some of the materials described above may interact in the final formulation, so that the components of the final formulation may be different from those that are initially added. For instance, metal ions (of, e.g., a detergent) can migrate to other acidic sites of other molecules. The products formed thereby, including the products formed upon employing the composition of the present invention in its intended use, may not susceptible of easy description. Nevertheless, all such modifications and reaction products are included within the scope of the present invention; the present invention encompasses the composition prepared by admixing the components described above.

Each of the documents referred to above is incorporated herein by reference. Except in the examples, or where otherwise explicitly indicated, all numerical quantities in this description specifying amounts of materials, reaction conditions, molecular weights, number of carbon atoms, and the like, are to be understood as modified by the word "about". Unless otherwise indicated, each chemical or composition referred to herein should be interpreted as being a commercial grade material which may contain the isomers, by-products, derivatives, and other such materials which are normally understood to be present in the commercial grade. However, the amount of each chemical component is presented exclusive of any solvent or diluent oil which may be customarily present in the commercial material, unless otherwise indicated. It is to be understood that the upper and lower amount, range, and ratio limits set forth herein may be independently combined. As used herein, the expression "consisting essentially of" permits the inclusion of substances which do not materially affect the basic and novel characteristics of the composition under consideration.

While the invention has been explained in relation to its preferred embodiments, it is to be understood that various modifications thereof will become apparent to those skilled in the art upon reading the specification. Therefore, it is to be understood that the invention disclosed herein is intended to cover such modifications that fall within the scope of the appended claims.

What is claimed is:

1. An emulsion comprising
   (A) a discontinuous phase comprising at least one oxygen-supplying component;
   (B) a continuous organic phase; and
   (C) an emulsifying amount of at least one nitrogen and transition metal containing composition derived from hydrocarbyl substituted polycarboxylic acids selected from the group consisting of
      (C-1) amide and imide derivatives of transition metal salts,
      (C-2) transition metal complexes of non-acidic acylated nitrogen compounds, and
      (C-3) a mixture of acylated nitrogen compounds and transition metal salts.

2. The emulsion of claim 1 wherein the discontinuous phase (A) is a discontinuous aqueous phase comprising from about 5% to about 98% by weight of the total weight of the emulsion.

3. The emulsion of claim 1 wherein the hydrocarbon substituent in (C) contains from about 16 to about 750 carbon atoms, the nitrogen moiety is derived from an amine selected from the group consisting of alkylene polyamines and hydroxyalkyl substituted alkylene polyamines having up to about 8 carbon atoms in the alkylene radical and up to about 6 carbon atoms in the hydroxy alkyl group and the metal is a first transition group metal.

4. The emulsion of claim 3 wherein the alkylene radicals contain 2 or 3 carbon atoms and the metal is selected from the group consisting of copper and zinc.

5. The emulsion of claim 1 wherein the hydrocarbon substituted polycarboxylic acid is a succinic acid or an anhydride thereof and the number average molecular weight of the hydrocarbon substituent ranges from about 700 to about 2,000.

6. The emulsion of claim 1 further comprising from about 1% to about 50% by weight of a co-emulsifier, based on total emulsifier concentration, wherein the co-emulsifier has an HLB ranging from about 1 to about 6.

7. The emulsion of claim 1 wherein the emulsifier comprises from about 5% to about 50% by weight of the total weight of the continuous organic phase.

8. An explosive emulsion comprising
   (A) a discontinuous oxidizer phase comprising at least one oxygen-supplying component;
   (B) a continuous organic phase which comprises at least one carbonaceous fuel; and
   (C) an emulsifying amount of at least one nitrogen and transition metal containing derivative of a hydrocarbon substituted polycarboxylic acid selected from the group consisting of
      (C-1) amide and imide derivatives of transition metal salts,
      (C-2) transition metal complexes of non-acidic acylated nitrogen compounds, and
      (C-3) a mixture of acylated nitrogen compounds and transition metal salts.

9. The explosive emulsion of claim 8 wherein the discontinuous oxidizer phase (A) is a discontinuous aqueous phase, the metal is a first transition group metal, and the nitrogen moiety of (C) is derived from an amine selected from the group consisting of alkylene polyamines and hydroxyalkyl substituted alkylene polyamines having up to about 8 carbon atoms in the alkylene group and up to about 6 carbon atoms in the hydroxyalkyl group.

10. The explosive emulsion of claim 8 wherein the hydrocarbon substituent in (C) contains from about 16 to about 750 carbon atoms.

11. The explosive emulsion of claim 14 wherein the hydrocarbon substituted polycarboxylic acid is a polyisobutylene substituted succinic acid or an anhydride thereof, wherein the polyisobutylene substituent has a number average molecular weight ranging from about 300 to about 5,000.

12. The explosive emulsion of claim 8 wherein (C) is prepared by reacting about two equivalents of a hydrocarbon substituted succinic acid or anhydride containing at least about 30 carbon atoms in the hydrocarbon substituent with about one equivalent of a basic metal reactant selected from the class consisting of transition metal oxides, hydroxides, carbonates and lower alcoholates and the successive combination of an alkali metal hydroxide and an inorganic transition metal salt consisting of cadmium and zinc halides and nitrates, and from one to about five equivalents of an amine selected from the group consisting of alkylene polyamines and hydroxyalkyl substituted alkylene polyamines having up to about 8 carbon atoms in the alkylene group and up to about six carbon atoms in the hydroxyalkyl group.

13. The explosive emulsion of claim 8 wherein (C) is prepared by reacting one equivalent of a mono transition metal salt of a hydrocarbon substituted succinic acid with from about 1 to about 5 equivalents of an amine selected from the group consisting of alkylene polyamines and hydroxy alkyl substituted alkylene polyamines having up to eight carbon atoms in the alkylene group and up to about 6 carbon atoms in the hydroxyalkyl group.

14. The explosive emulsion of claim 8 wherein (C) is prepared by reacting one equivalent of a hydrocarbon substituted succinic acid or anhydride with from 1 to about 5 equivalents of an amine selected from the group consisting of alkylene polyamines and hydroxy alkyl substituted alkylene polyamines having up to about 8 carbon atoms in the alkylene group and up to about 6 carbon atoms in the hydroxy alkyl group, heating to effect acylation, removing water to form an acylated amine then reacting the acylated polyamine with about one equivalent of a basic metal reactant selected from the class consisting of transition metal oxides, hydroxides, carbonates and lower alcoholates and the successive combination of an alkali metal hydroxide and an inorganic metal salt consisting of alkaline earth metal, lead, cadmium, and zinc halides and nitrates.

15. The explosive emulsion of claim 8 wherein (C) is prepared by mixing together acylated nitrogen derivatives and transition metal salt derivatives of hydrocarbon substituted polycarboxylic acids or functional equivalents thereof.

16. The explosive emulsion of claim 8 wherein (C) is a metal complex of a hydrocarbyl substituted succinic acid acylated nitrogen compound.

17. The explosive emulsion of claim 8 further comprising from about 1% to about 50% by weight of a co-emulsifier, based on total emulsifier concentration, wherein the co-emulsifier has an HLB ranging from 1 to about 6.

18. The explosive emulsion of claim 8 further comprising a self explosive material.

19. The explosive emulsion of claim 8 wherein the carbonaceous fuel is at least one of a mineral oil, diesel fuel and vegetable oil.

20. The explosive emulsion of claim 8 wherein the discontinuous aqueous oxidizer phase comprises from about 90% to about 98% by weight of the total weight of the explosive emulsion, the oxygen-supplying component comprises from about 75% up to about 100% by weight of the oxidizer phase, and wherein the oxygen-supplying component comprises at least one of ammonium, alkali metal, and alkaline earth metal nitrates, and alkali metal perchloroates.

21. The explosive emulsion of claim 8 wherein the emulsifier comprises from about 5% to about 50% by weight of the total weight of the continuous organic phase.

22. The emulsion explosive of claim 8 further comprising (D) a sensitizing agent.

23. The explosive emulsion of claim 22 wherein the sensitizing agent comprises an alkali metal nitrite or an alkali metal thiocyanate or thiourea.

24. A composition comprising an oxidizer component, a carbonaceous fuel and a nitrogen and transition metal containing derivative of a hydrocarbon substituted polycarboxylic acid selected from the group consisting of (C-1) amide and imide derivatives of transition metal salts, (C-2) transition metal complexes of non-acidic acylated nitrogen compounds, and (C-3) a mixture of acylated nitrogen compounds and transition metal salts.

* * * * *